United States Patent [19]

Lin

[11] Patent Number: 5,358,459

[45] Date of Patent: Oct. 25, 1994

[54] MECHANIC DRIVE APPARATUS

[76] Inventor: Hung-Chung Lin, No.8, Lane 255, Lai-Nan St., Kaohsiung City

[21] Appl. No.: 145,534

[22] Filed: Nov. 3, 1993

[51] Int. Cl.$^5$ .......................... F16H 1/30; F16H 15/10
[52] U.S. Cl. ..................... 475/306; 475/182; 475/226; 476/34
[58] Field of Search ............... 475/182, 226, 227, 207, 475/306, 317; 476/27, 30, 33, 34, 35, 55, 56, 57, 58

[56] References Cited

U.S. PATENT DOCUMENTS

| 1,379,031 | 5/1921 | McPherson | 476/34 X |
| 1,387,208 | 8/1921 | Storey | 475/226 X |
| 1,397,296 | 11/1921 | Schaf, Jr. et al. | 476/57 X |
| 2,438,778 | 3/1948 | Fabia | 475/306 X |
| 5,267,919 | 12/1993 | Lin | 476/30 |

*Primary Examiner*—David W. Laub
*Attorney, Agent, or Firm*—Banner, Birch, McKie and Beckett

[57] ABSTRACT

A mechanic drive apparatus includes a driving shaft and a hollow rotatable housing which has a rear side mounted on one end of the driving shaft. An output shaft extends into the rotatable housing and is mounted rotatably thereto. The output shaft is aligned axially with the driving shaft. A driven gear is mounted fixedly on the output shaft and is disposed inside the rotatable housing. A pair of driven transmission shafts are disposed on opposite edges of the driven gear. Each of the driven transmission shafts is provided with a worm segment that extends into the rotatable housing and that meshes with the driven gear. A pair of intermediate shafts are mounted rotatably to the rotatable housing in a direction which is transverse to the output shaft. A small bevel gear is mounted fixedly on each of the intermediate shafts. A pair of belt drive units transmit the rotating force of the intermediate shafts to the driven transmission shafts. A large bevel gear is mounted rotatably on the driving shaft and is disposed adjacent to the rear side of the rotatable housing. The large bevel gear meshes with the small bevel gears.

3 Claims, 7 Drawing Sheets

MECHANIC DRIVE APPARATUS

BACKGROUND OF THE INVENTION

1. Field of the Invention

The invention relates to a mechanic drive apparatus, more particularly to a mechanic drive apparatus which is simple and compact in construction and which is capable of maintaining a fixed output speed for a specified operating load.

2. Description of the Related Art

Referring to FIG. 1, a mechanic drive apparatus which was disclosed by the applicant in his co-pending U.S. patent application Ser. No. 07/985,193, filed on Dec. 3, 1992, is shown to comprise a driving shaft 1, a driven gear 2, now U.S. Pat. No. 5,267,919, an intermediate transmission unit 4 and a set of worm segments 3. The driven gear 2 is mounted rotatably on the driving shaft 1. The intermediate transmission unit 4 includes a pair of intermediate shafts 41, a pair of driven transmission shafts 42 and a disc-shaped support 43. Each of the intermediate shafts 41 is disposed transverse to the driving shaft 1 and has one end mounted rotatably thereto. The other ends of the intermediate shafts 41 are secured to one end of a respective connecting member 403. Each of the driven transmission shafts 42 has one end mounted rotatably on the other end of the respective connecting member 403. A driving wheel 411 is mounted rotatably on each of the intermediate shafts 41 and has a circular rim which is in frictional contact with the support 43. Endless flexible bands 412 are provided to enable the driving wheels 411 to drive rotatably the driven transmission shafts 42. Each of the worm segments 3 meshes with the teeth of the driven gear 2 and is provided on the other end of a respective one of the driven transmission shafts 42. Each of a complementary pair of linkage members 44 is formed with a keyway 442 and has one end connected to the driving shaft 1 so that the linkage members 44 will rotate with the same. Each of the driving wheels 411 is provided with a key 405 which engages a respective one of the keyways 442. A coil spring 402 is disposed around each of the intermediate shafts 41 to bias the driving wheels 411 toward the axis of the driving shaft 1. Changes in the speed of the driven gear 2 relative to the driving shaft 1 occurs when the driving wheel 411 moves axially along the axis of the driven transmission shaft 42 so as to vary the position of frictional contact between the driving wheel 411 and the support 43.

Referring to FIG. 2, the linkage members 44 rotate with the driving shaft 1 when an external driving force is applied to the latter. The resulting centrifugal force will cause the driving wheels 411 to move along the intermediate shafts 41 until the centrifugal force matches the biasing force of the coil springs 402. At this stage, the intermediate shafts 41 and the driven transmission shafts 42 revolve around the axis of the driving shaft 1 due to the engagement between the keys 405 and the keyways 442. Since the driving wheels 411 are in frictional contact with the support 43, the driving wheels 411 rotate relative to the intermediate shafts 41 due to rotation of the latter relative to the support 43, thereby enabling the driving wheels 411 to drive rotatably the driven transmission shafts 42 by means of the endless flexible bands 412. The worm segments 3 rotate with the driven transmission shafts 42. Aside from driving rotatably the driven gear 2, slight shifting movement of the worm segments 3 relative to the driven gear 2 also occurs, thereby resulting in an output speed which is different from that of the driving shaft 1. The distance between the driving wheels 411 and the axis of the driving shaft 1 varies in accordance with the speed of the driving shaft 1. When the driving wheels 411 are disposed closer to the center of the support 43, the difference between the input and output speeds is relatively small. When the driving wheels 411 are disposed farther from the center of the support 43, the difference between the input and output speeds is larger. This indicates how the mechanic drive apparatus achieves stepless variable-speed control of the driven gear 2.

It is noted that since the above described mechanic drive apparatus is relatively large and requires a large number of components, the mechanic drive apparatus is not suitable for use in relatively small devices.

SUMMARY OF THE INVENTION

Therefore, the objective of the present invention is to provide a mechanic drive apparatus which is simple and compact in construction and which is capable of maintaining a fixed output speed for a specified operating load.

Accordingly, the mechanic drive apparatus of the present invention comprises:
 a rotatable driving shaft;
 a hollow rotatable housing having a rear side mounted on one end of the driving shaft;
 an output shaft extending into the rotatable housing and being mounted rotatably thereto, the output shaft being aligned axially with the driving shaft;
 a driven gear mounted fixedly on the output shaft and disposed inside the rotatable housing;
 a pair of driven transmission shafts disposed on opposite edges of the driven gear, each of the driven transmission shafts being provided with a worm segment that extends into the rotatable housing and that meshes with the driven gear;
 a pair of intermediate shafts mounted rotatably to the rotatable housing in a direction which is transverse to the output shaft;
 a small bevel gear mounted fixedly on each of the intermediate shafts;
 a pair of belt drive units for transmitting rotating force of the intermediate shafts to the driven transmission shafts; and
 a large bevel gear mounted rotatably on the driving shaft and disposed adjacent to the rear side of the rotatable housing, the large bevel gear meshing with the small bevel gears.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
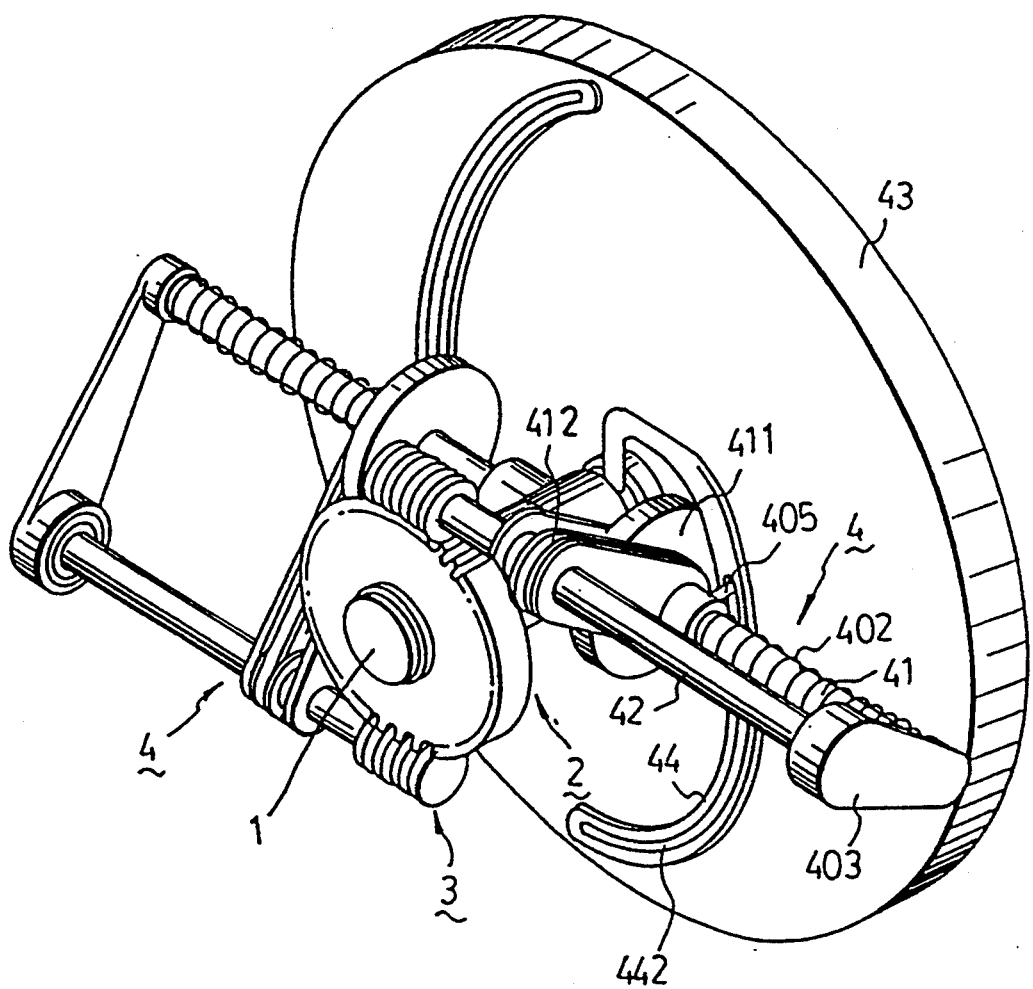
FIG. 1 shows a schematic perspective view of a mechanic drive apparatus disclosed in co-pending U.S. patent application Ser. No. 07/985,193, now U.S. Pat. No. 5,267,919 by the applicant.
Figure 2:
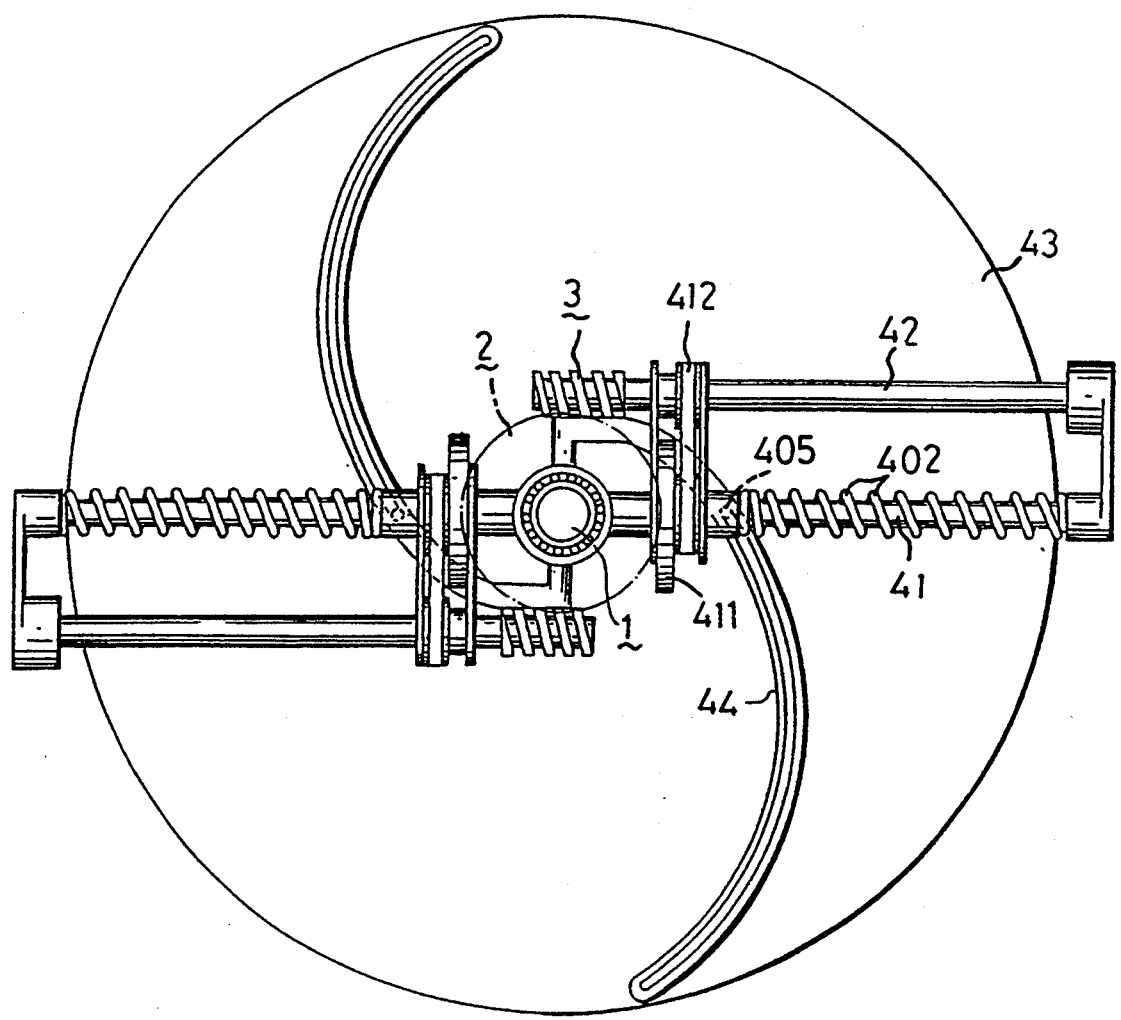
FIG. 2 is a schematic view which illustrates the operation of the mechanic drive apparatus shown in FIG. 1.

Before the present invention is described in greater detail, it should be noted that like elements are indicated by the same reference numerals throughout the disclosure.

Figure 3:
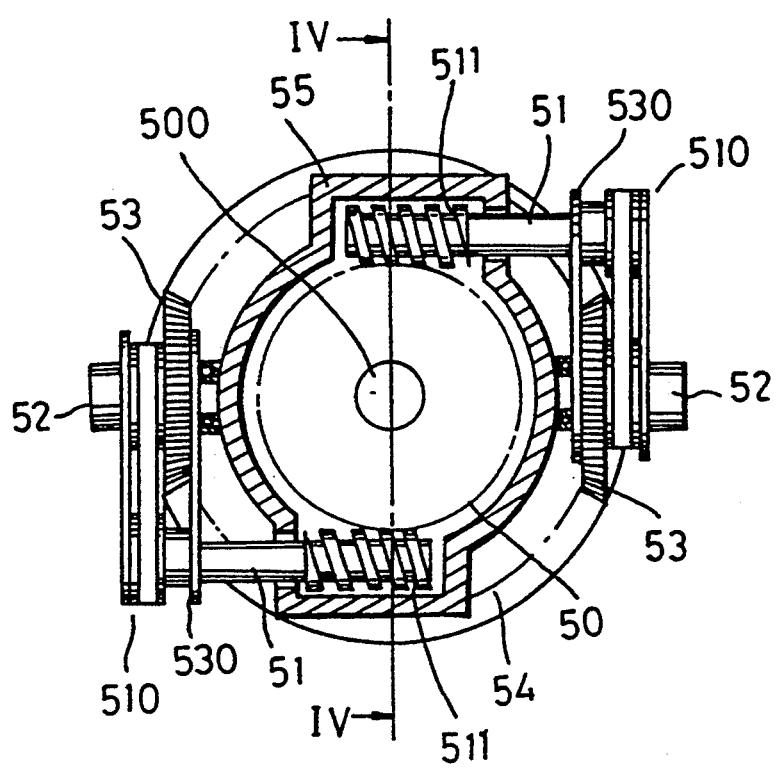
FIG. 3 illustrates the first preferred embodiment of a mechanic drive apparatus according to the present invention.
Figure 4:
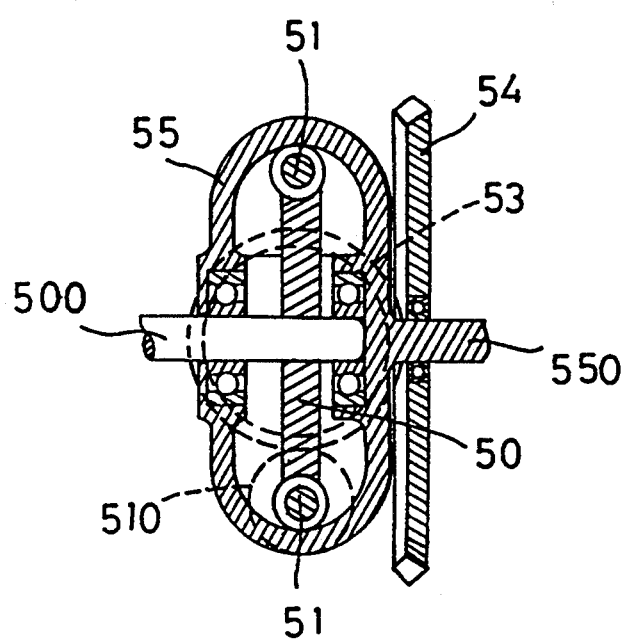
FIG. 4 is a sectional view of the first preferred embodiment taken along line IV—IV in FIG. 3.

Referring to FIGS. 3 and 4, the first preferred embodiment of a mechanic drive apparatus according to the present invention is shown to comprise a hollow rotatable housing 55, an output shaft 500 which extends into the rotatable housing 55 and which is mounted rotatably thereto, a driven gear 50 which is mounted fixedly on the output shaft 500 and which is disposed inside the rotatable housing 55, and a pair of driven transmission shafts 51 which are disposed on opposite edges of the driven gear 50. Each of the driven transmission shafts 51 has one end which is provided with a worm segment 511 that extends into the rotatable housing 55 so as to mesh with the driven gear 50. The other end of each driven transmission shaft 51 is provided with a belt drive unit 510 which serves to transmit the rotation of a respective intermediate shaft 52 to the driven transmission shaft 51. Each of the intermediate shafts 52 has a small bevel gear 53 mounted fixedly thereon and is mounted rotatably to the rotatable housing 55 in a direction which is transverse to the axis of the driven gear 50. The small bevel gears 53 mesh with a large bevel gear 54 which is mounted rotatably on a driving shaft 550 and which is disposed adjacent to the rear side of the rotatable housing 55. The driving shaft 550 is aligned axially with the output shaft 500 and is connected to the rear side of the rotatable housing 55 in order to enable the latter to rotate therewith. Each of the small bevel gears 53 is provided with a connecting member 530 which connects the former with the driven transmission shafts 51.

The operation of the first preferred embodiment is described briefly as follows: The rotatable housing 55 rotates with the driving shaft 550 when an external force is applied on the latter. Rotation of the rotatable housing 55 causes the intermediate shafts 52 and the driven transmission shafts 51 to revolve around the axis of the driven gear 50. At this time, axial rotation of the small bevel gears 53 occurs as they revolve around the axis of the large bevel gear 54. Axial rotation of the small bevel gears 53 causes the intermediate shafts 52 to rotate therewith. The rotation of the intermediate shafts 52 is transmitted to the driven transmission shafts 51 by means of the belt drive units 510, thus rotating the worm segments 511 to rotate correspondingly the driven gear 50. The threads on the worm segments 511 may be oriented in a first direction, wherein the worm segments 511 enable the driven gear 50 and the output shaft 500 to rotate at a faster speed than the driving shaft 550, and in an opposite second direction, wherein the worm segments 511 cause the driven gear 50 and the output shaft 500 to rotate at a slower speed than the driving shaft 550.

Note that the mechanic drive apparatus shown in FIGS. 3 and 4 is relatively small and requires a fewer number of components. The mechanic drive apparatus is thus suitable for use in relatively small devices. Furthermore, the mechanic drive apparatus is capable of maintaining a fixed output speed for a specified operating load.

Figure 5:
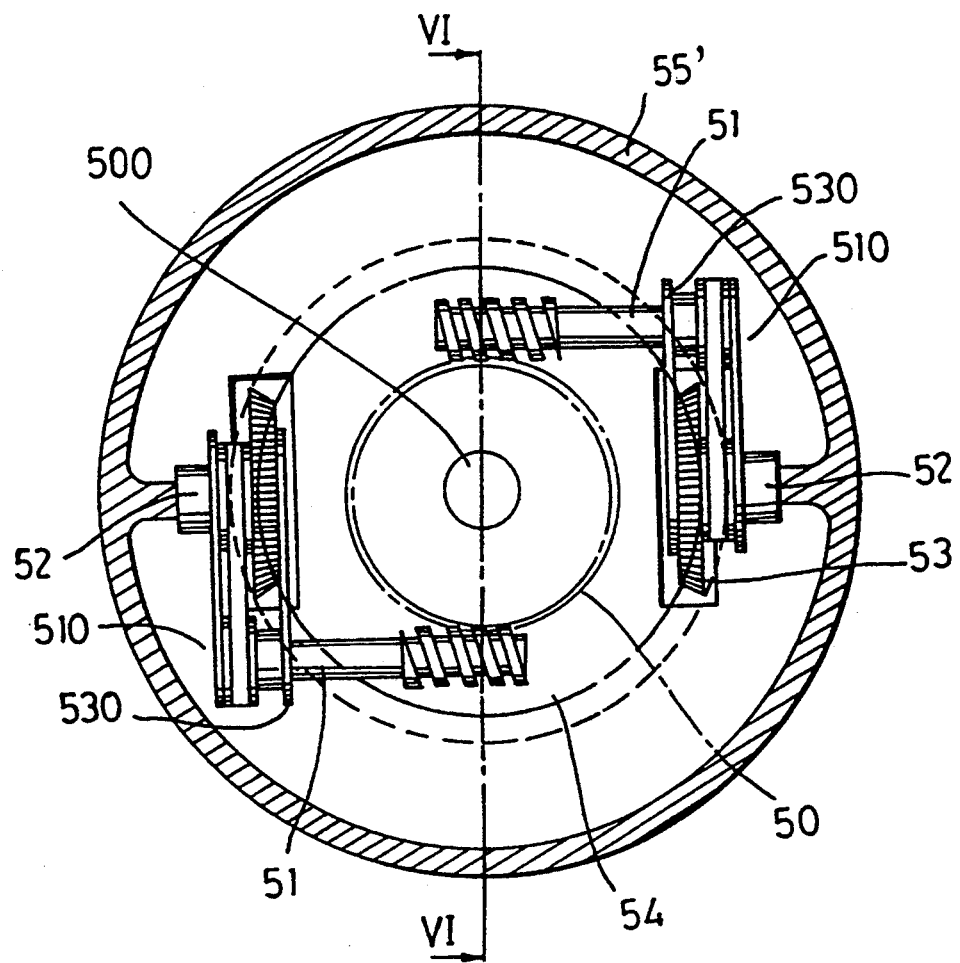
FIG. 5 illustrates the second preferred embodiment of a mechanic drive apparatus according to the present invention.
Figure 6:
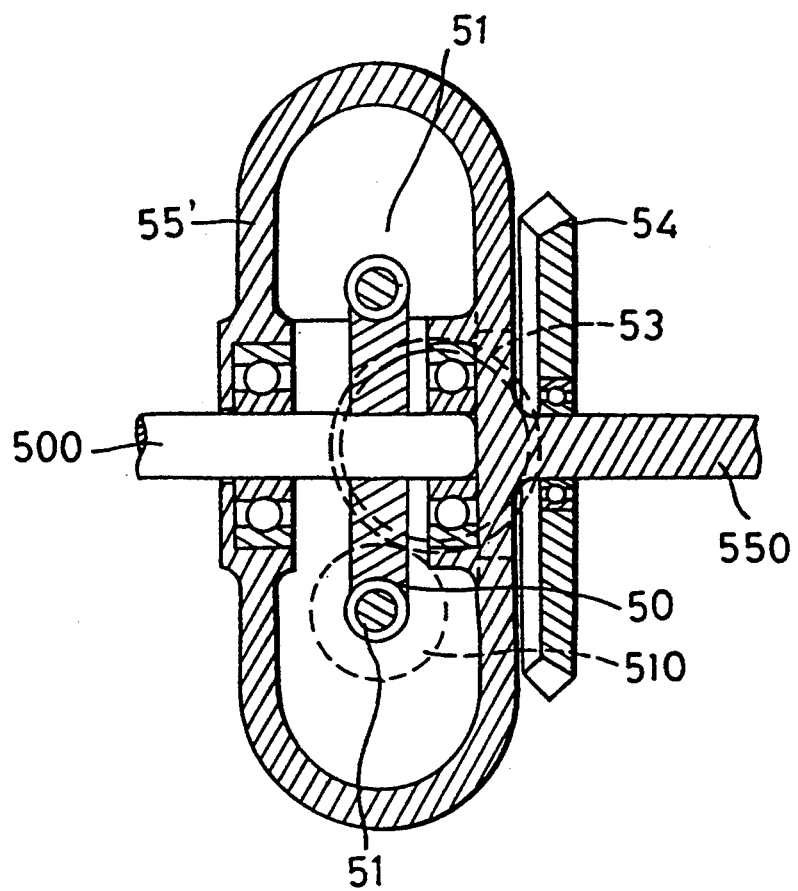
FIG. 6 is a sectional view of the second preferred embodiment taken along line VI—VI in FIG. 5.

FIGS. 5 and 6 illustrate the second preferred embodiment of a mechanic drive apparatus according to the present invention. The second preferred embodiment is generally similar in construction to the previous embodiment, except that the rotatable housing 55' is larger and confines the intermediate shafts 52 and the driven transmission shafts 51 therein. The rotatable housing 55' has a pair of slots which permit the small bevel gears 53 to extend therethrough so as to engage the large bevel gear 54. Because the size of the rotatable housing 55' is increased, a larger inertia force is generated when the rotatable housing 55' rotates, thereby enhancing the stability of the mechanic drive apparatus. The operation of the second preferred embodiment is generally similar to that of the previous embodiment and will not be detailed further.

Figure 7:
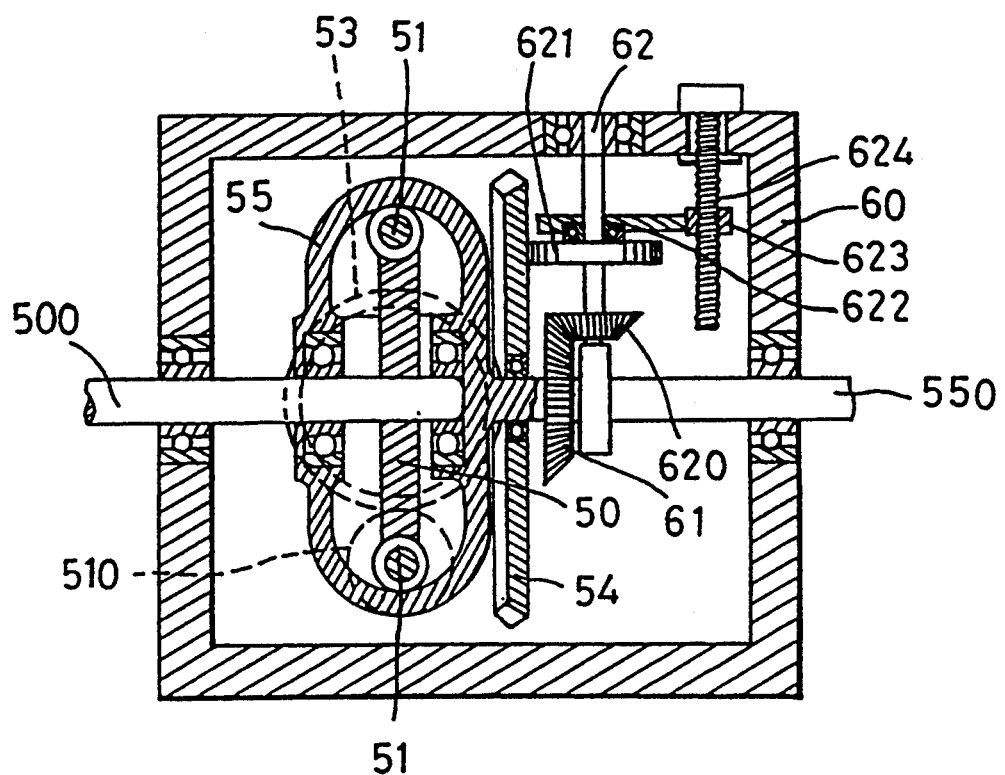
FIG. 7 illustrates the third preferred embodiment of a mechanic drive apparatus according to the present invention.

FIG. 7 illustrates the third preferred embodiment of a mechanic drive apparatus according to the present invention. In this embodiment, either of the mechanic drive apparatus of the previous embodiments is installed in a hollow machine base 60. The driving shaft 550 and the output shaft 500 are mounted rotatably to and extend through opposite side walls of the hollow machine base 60. The third preferred embodiment further comprises a friction wheel 621 and an adjustment bolt 624 to control the resistance to the rotation of the large bevel gear 54 to vary correspondingly the speed of the small bevel gears 53. In this embodiment, a first small bevel gear 61 is mounted fixedly on the driving shaft 550 and is disposed adjacent to a rear side of the large bevel gear 54. An axle 62 has a first end mounted rotatably on a third side wall of the hollow machine base 60 and a second end mounted rotatably and transversely to the driving shaft 550. A second small bevel gear 620 is mounted fixedly on the axle 62 and meshes with the first small bevel gear 61. The friction wheel 621 has a circular rim which is in frictional contact with the rear side of the large bevel gear 54 and is mounted slidably on the axle 62 so as to vary the position of frictional contact between the friction wheel 621 and the large bevel gear 54. A connecting member 622 has one end connected to the friction wheel 621. The other end of the connecting member 622 is formed with a threaded socket 623. The adjustment bolt 624 is mounted rotatably on the third side wall of the hollow machine base 60 and has a threaded shank which extends into the threaded socket 623. When the adjustment bolt 624 is rotated, the connecting member 622 moves along the length of the threaded shank of the adjustment bolt 624 and moves the friction wheel 621 therewith, thereby varying the position of frictional contact between the friction wheel 621 and the large bevel gear 54 to vary correspondingly the speed of the large bevel gear 54. This illustrates how the third preferred embodiment achieves stepless variable-speed control of the driven gear 50.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A mechanic drive apparatus, comprising:
   a rotatable driving shaft;
   a hollow rotatable housing having a rear side mounted on one end of said driving shaft;
   an output shaft extending into said rotatable housing and being mounted rotatably thereto, said output shaft being aligned axially with said driving shaft;
   a driven gear mounted fixedly on said output shaft and disposed inside said rotatable housing;
   a pair of driven transmission shafts disposed on opposite edges of said driven gear, each of said driven transmission shafts being provided with a worm segment that extends into said rotatable housing and that meshes with said driven gear;
   a pair of intermediate shafts mounted rotatably to said rotatable housing in a direction which is transverse to said output shaft;
   a small bevel gear mounted fixedly on each of said intermediate shafts;
   a pair of drive members for transmitting rotating force of said intermediate shafts to said driven transmission shafts; and
   a large bevel gear mounted rotatably on said driving shaft and disposed adjacent to said rear side of said rotatable housing, said large bevel gear meshing with said small bevel gears.

2. The mechanic drive apparatus as claimed in claim 1, wherein said drive members are belt drive units.

3. The mechanic drive apparatus as claimed in claim 1, further comprising:
   a friction wheel unit which has a circular rim that is in frictional contact with a rear side of said large bevel gear; and
   an adjustment unit including a connecting member having a first end connected to said friction wheel unit and a second end which is formed with a threaded socket, and an adjustment bolt which engages threadedly said threaded socket and which is rotatable so as to move said connecting member and said friction wheel unit to vary a position of frictional contact between said friction wheel unit and said large bevel gear to vary resistance to rotation of said large bevel gear.

* * * * *